United States Patent
Delong et al.

(10) Patent No.: US 12,331,814 B2
(45) Date of Patent: Jun. 17, 2025

(54) REVERSE MULTI-TRACK BALL SCREW

(71) Applicant: SAFRAN ELECTRONICS & DEFENSE ACTUATION, Auxerre (FR)

(72) Inventors: Joffrey Delong, Moissy-Cramayel (FR); Daniel Hors, Moissy-Cramayel (FR)

(73) Assignee: SAFRAN ELECTRONICS & DEFENSE ACTUATION, Auxerre (FR)

( * ) Notice: Subject to any disclaimer, the term of this patent is extended or adjusted under 35 U.S.C. 154(b) by 0 days.

(21) Appl. No.: 17/639,677

(22) PCT Filed: Sep. 2, 2020

(86) PCT No.: PCT/EP2020/074470
§ 371 (c)(1),
(2) Date: Mar. 2, 2022

(87) PCT Pub. No.: WO2021/043826
PCT Pub. Date: Mar. 11, 2021

(65) Prior Publication Data
US 2022/0290745 A1    Sep. 15, 2022

(30) Foreign Application Priority Data
Sep. 2, 2019    (FR) ........................ 1909619

(51) Int. Cl.
*F16H 25/20*    (2006.01)
*F16H 25/22*    (2006.01)

(52) U.S. Cl.
CPC ................. *F16H 25/2228* (2013.01)

(58) Field of Classification Search
CPC ............ F16H 25/2228; F16H 25/2214; F16H 2025/2271; F16H 25/2233; F16H 25/2204
See application file for complete search history.

(56) References Cited

U.S. PATENT DOCUMENTS

| | | | |
|---|---|---|---|
| 2,590,745 A | 3/1952 | Wuensch | |
| 2012/0325036 A1 * | 12/2012 | Harada | B21K 1/70 72/352 |

(Continued)

FOREIGN PATENT DOCUMENTS

| | | | | |
|---|---|---|---|---|
| CN | 115899197 A | * | 4/2023 | ............ B64C 13/34 |
| DE | 102014113484 B3 | * | 9/2015 | ......... F16H 25/2214 |

(Continued)

OTHER PUBLICATIONS

International Search Report mailed Nov. 16, 2020, issued in corresponding International Application No. PCT/EP2020/074470, filed Sep. 2, 2020, 5 pages.

(Continued)

*Primary Examiner* — Zakaria Elahmadi
(74) *Attorney, Agent, or Firm* — CHRISTENSEN O'CONNOR JOHNSON KINDNESS PLLC (57) ABSTRACT

A cam includes a cylindrical ring having a substantially circular outer section and, externally, a helical running track. The ring has a conduit that connects two ends of the external helical running track, and the conduit comprising includes a track for recirculation between the ends of the running track.

8 Claims, 8 Drawing Sheets

(56) References Cited

U.S. PATENT DOCUMENTS

| | | | | |
|---|---|---|---|---|
| 2014/0150580 | A1* | 6/2014 | McEntee | F16H 25/2233 74/89.34 |
| 2015/0362050 | A1* | 12/2015 | Kuo | F16H 25/2228 74/424.85 |
| 2017/0254395 | A1* | 9/2017 | Tsai | F16H 25/2228 |
| 2020/0362947 | A1* | 11/2020 | Castell | F16H 25/2015 |

FOREIGN PATENT DOCUMENTS

| | | | | | |
|---|---|---|---|---|---|
| EP | 1350988 | A1 | * | 10/2003 | F16H 25/2219 |
| EP | 1602858 | A1 | * | 12/2005 | F16H 25/22 |
| FR | 2938893 | A1 | * | 5/2010 | F16H 25/2228 |
| GB | 2060126 | A | * | 4/1981 | F16H 25/2228 |
| JP | 2003083415 | A | * | 3/2003 | |
| JP | 2004263728 | A | * | 9/2004 | F16H 25/22 |
| JP | 4665365 | B2 | * | 4/2011 | |
| KR | 101534057 | B1 | * | 7/2015 | F16H 25/2228 |
| SU | 653462 | A1 | | 3/1979 | |
| WO | WO-2015137494 | A1 | * | 9/2015 | B22F 3/225 |
| WO | WO-2016017458 | A1 | * | 2/2016 | B60W 10/04 |
| WO | WO-2016186150 | A1 | * | 11/2016 | B22F 3/02 |
| WO | WO-2017220713 | A1 | * | 12/2017 | B62D 3/126 |
| WO | WO-2022039110 | A1 | * | 2/2022 | B21D 26/033 |

OTHER PUBLICATIONS

Written Opinion mailed Nov. 16, 2020, issued in corresponding International Application No. PCT/EP2020/074470, filed Sep. 2, 2020, 5 pages.

English translation of Written Opinion mailed Nov. 16, 2020, issued in corresponding International Application No. PCT/EP2020/074470, filed Sep. 2, 2020, 6 pages.

International Preliminary Report on Patentability mailed Mar. 8, 2022, issued in corresponding International Application No. PCT/EP2020/074470, filed Sep. 2, 2020, 6 pages.

* cited by examiner

REVERSE MULTI-TRACK BALL SCREW

FIELD OF THE DISCLOSURE

The present disclosure relates to linear actuators comprising a first element that can move in translation under the action of a second element rotated parallel to the axis of translation, in particular by an electric motor.

BACKGROUND

Some known linear actuators include an axially rotated screw and a nut disposed around the screw and rotated by the screw by means of balls placed in a helical circulation track provided around the screw, the balls being able to recirculate from one end to the other of the circulation track. The circulation track can be disposed, for example, externally around the screw and only extend over a single turn by looping back up on itself. As an alternative, a recirculation tube can be added to the outside of the screw and connect the ends of the circulation track.

These systems do not enable a recirculation of the balls which is both compact and multi-track, in other words over more than one turn. Moreover, it is often necessary to use a plurality of nuts in order to increase the transfer of forces over the length of the rotating screw, requires which stricter tolerance requirements during manufacture of the nuts and multiplies the maintenance difficulties.

SUMMARY

The goal of the disclosure is to overcome at least some of the above-mentioned difficulties and to provide a linear actuator with multi-track recirculation of balls, which is configured to combine the advantages of robustness and compactness.

In view of the above, an object of the disclosure is a cam including a cylindrical ring having a substantially circular outer section and, externally, a helical rolling track, the ring comprising a duct that connects two ends of the outer helical rolling track, and the duct comprising a track for recirculation between the ends of the rolling track.

A transverse extension is provided, positioned facing an access of the duct and oriented towards the outside of the ring.

Advantageously, the duct includes an opening extending from the outer section of the ring to the duct, the cam further including a removable plug fitted in the opening.

For example, the opening is oriented substantially parallel to the axis of the ring.

The disclosure also relates to a linear actuator including such a cam and, further, an external tubular body extending along the axis of the cylindrical ring of the cam, the cam being mounted movable in translation inside the external tubular body, a plurality of balls of a same diameter further being inserted between the ring and the external tubular body, in the outer helical rolling track.

In an embodiment, the transverse extension constitutes means for guiding the balls, between the outer rolling track and the recirculation track.

Advantageously, the external tubular body includes an inner helical rolling track.

The transverse extension may include one end fitted in the inner helical rolling track.

In addition, the balls can be mounted in linear contact with the inner and outer helical rolling tracks.

According to an embodiment, two of the balls are connected in linear or point contact.

DESCRIPTION OF THE DRAWINGS

Further goals, features and advantages of the disclosure will become clear upon reading the following description, provided by way of non-limiting example and made with reference to the accompanying drawings, in which.

DETAILED DESCRIPTION

Figure 1:
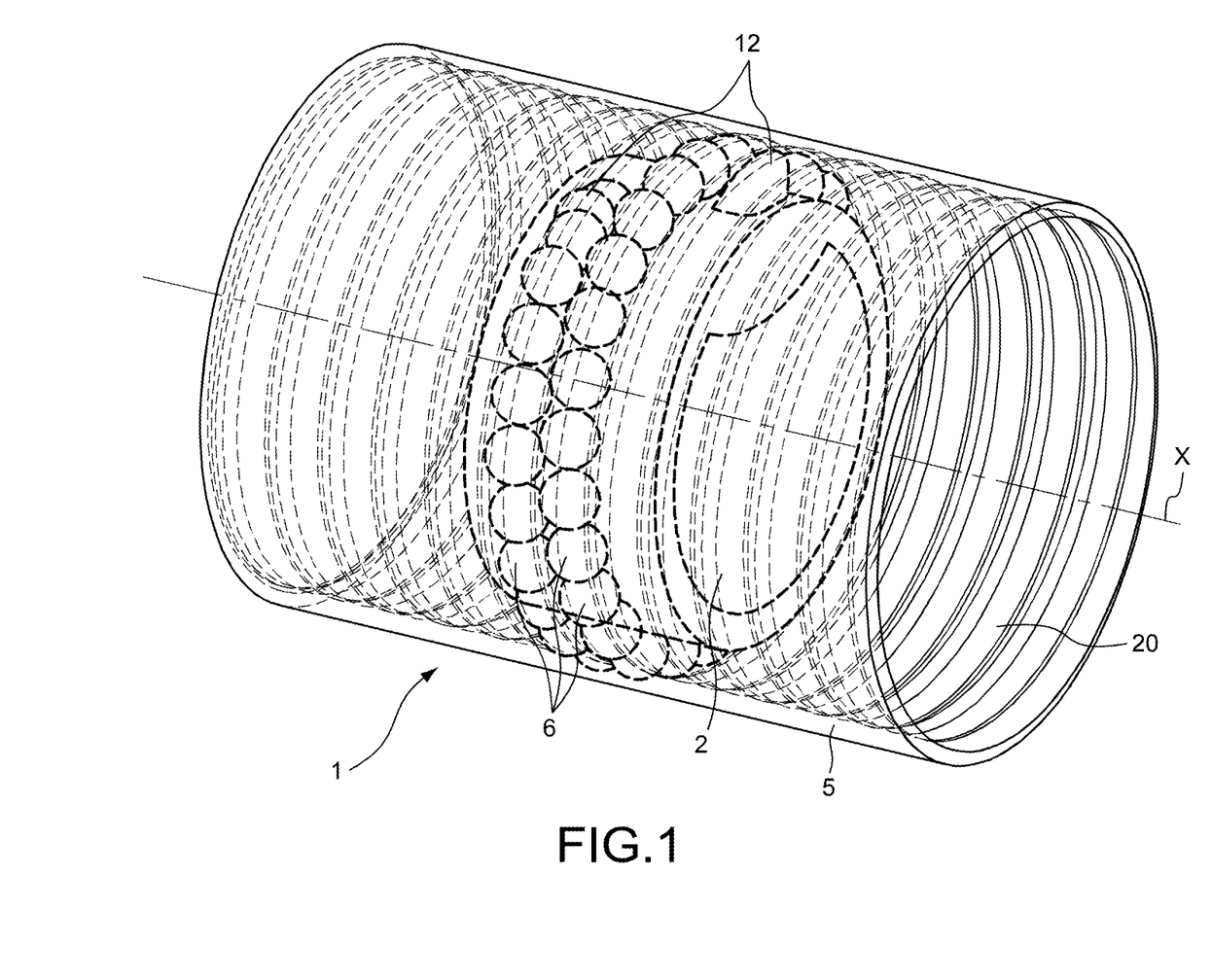
FIG. 1 shows a linear actuator according to the disclosure.

FIG. 1 illustrates a linear actuator 1 comprising an internal cam 2 forming a cylindrical internal ring 3 of substantially circular outer section 4, an external tubular body 5 and a plurality of balls 6 of a same diameter inserted between the internal ring 3 and the external tubular body 5 mounted coaxially along the axis X.

The cam 2 is mounted inside the external tubular body 5. A particularly compact system is thus formed of the "reverse" screw-nut type, wherein the screw as an internal threading and the nut is inside the reversed screw.

According to the operating mode of the actuator 1, the cam 2 can be either locked against rotation and free to move in translation along its axis X, or free to rotate and locked against movement in translation along its axis X if, as in this case, it is intended to internally receive a motor for rotating a shaft coaxial with its internal ring 3 (not shown).

Figure 2:
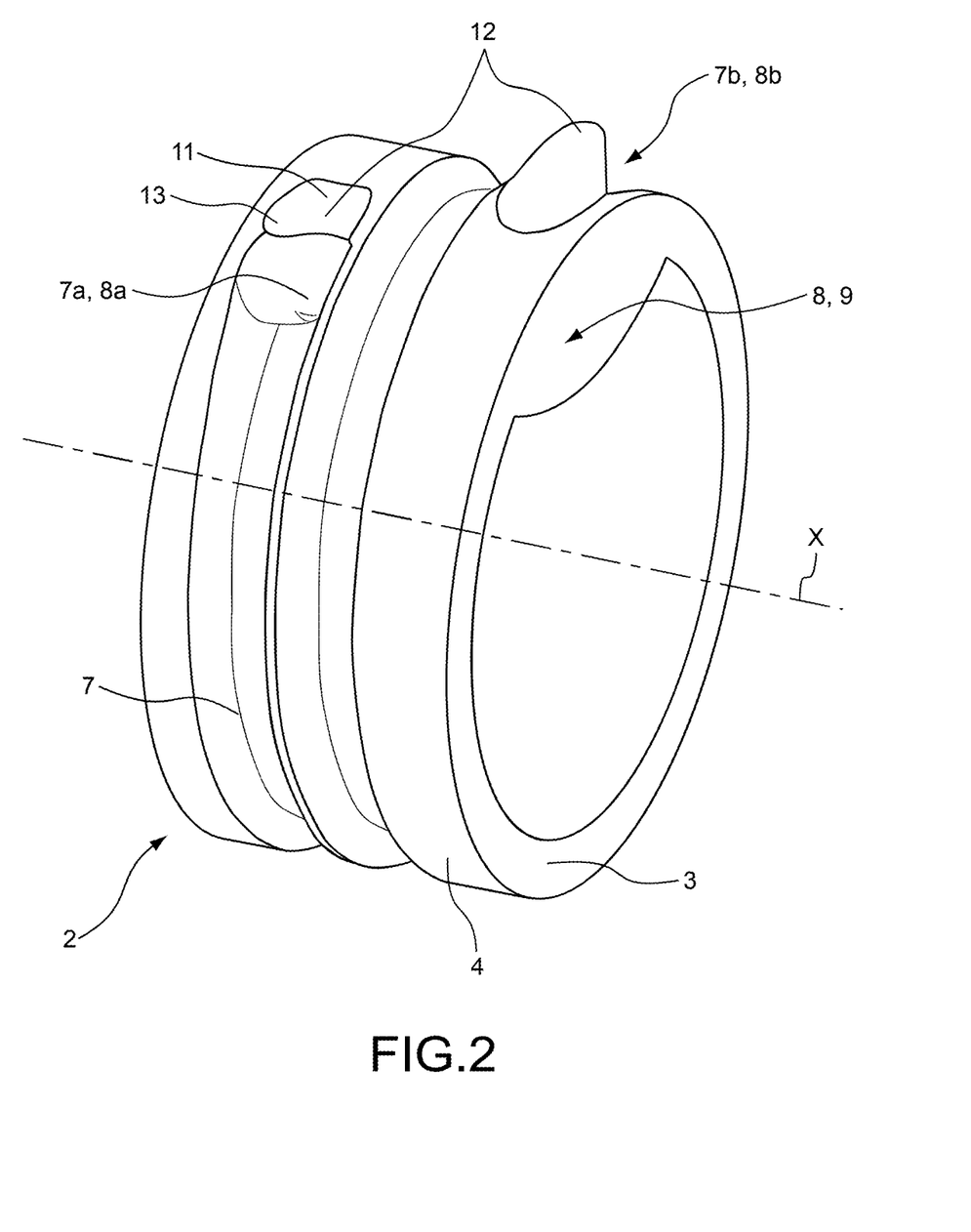
FIG. 2 shows a cam with recirculation, equipping the linear actuator of FIG. 1.

FIG. 2 shows the cam 2 which is externally equipped with a helical thread acting as outer helical rolling track 7.

The outer track 7 can be multi-track, in other words it can travel over a plurality of turns around the cam 2.

Figure 3:
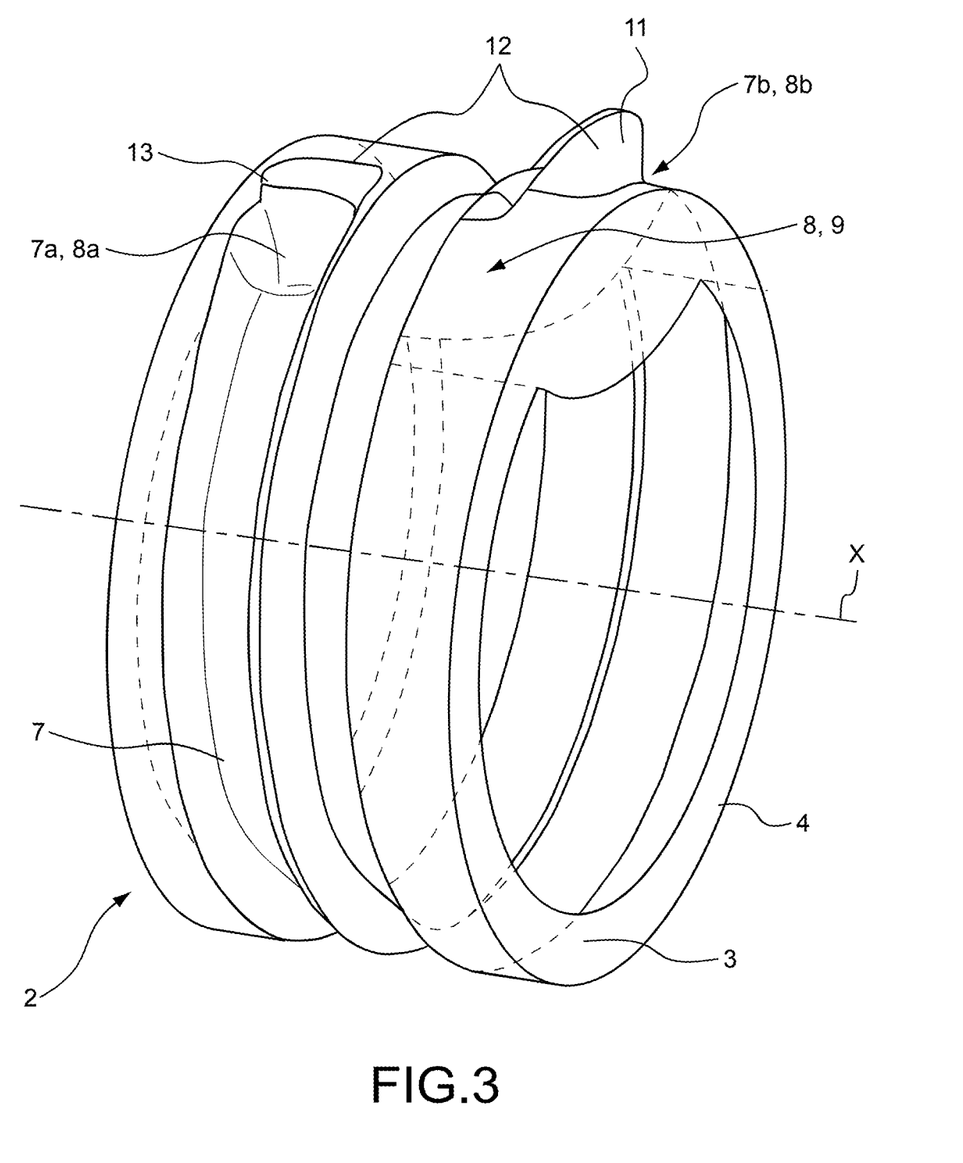
FIG. 3 reproduces the representation of the cam of FIG. 2 and, by transparency, shows the inner recirculation track.

As illustrated in FIG. 3, a duct 8 connects two ends 7a, 7b of the outer helical rolling track 7.

The duct 8 comprises an internal recirculation track 9 which continuously extends the outer track 7 and extends between two accesses 8a, 8b crossing the ring 3.

The recirculation track 9 is curved and tangentially continuous with the outer helical rolling track 7 in order to prevent jamming of balls 6 in the recirculation track 9 or at one of its accesses 8a, 8b.

Figure 4:
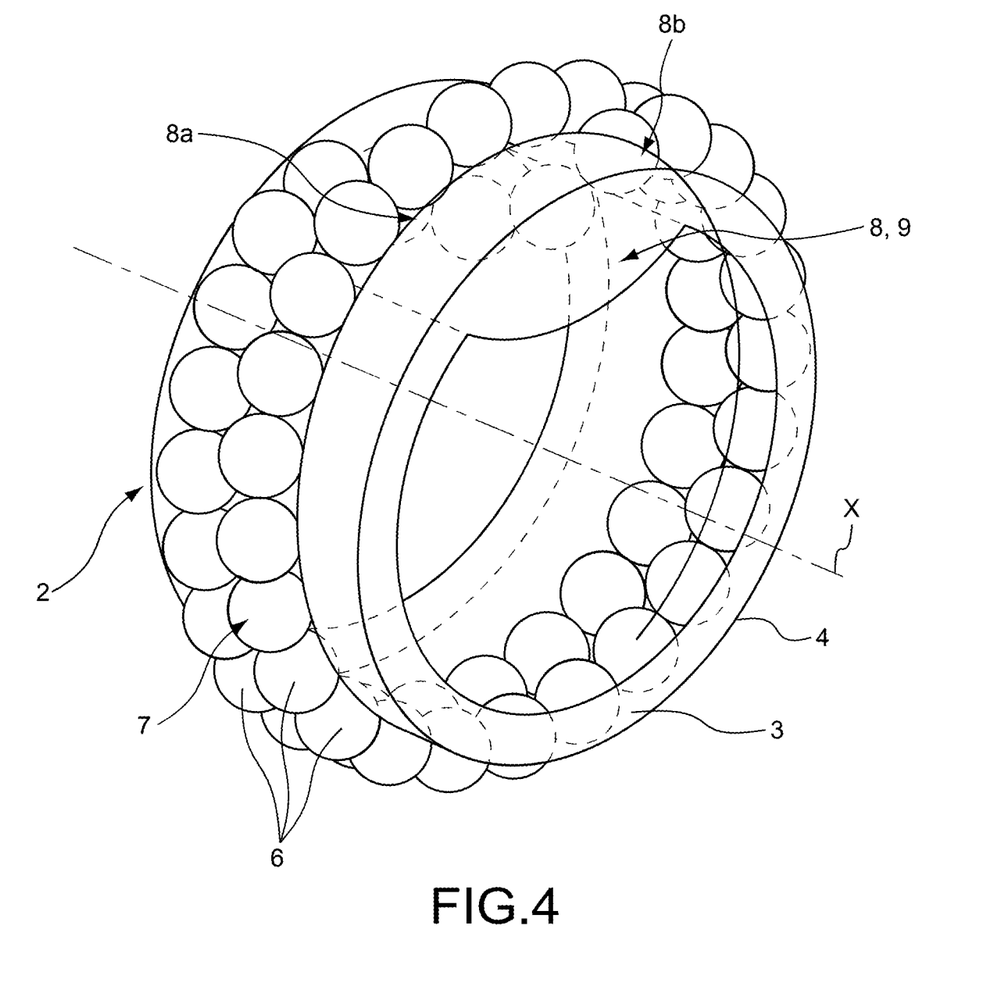
FIG. 4 reproduces the representation of FIG. 3 and illustrates the passage of the balls over the circulation and recirculation tracks.

As can be seen in FIG. 4, the balls 6 are intended to circulate on the outer helical rolling track 7 and on the internal recirculation track 9, through the duct 8.

In particular, the balls 6 are mounted in linear contact with the internal ring 3 and the external tube 5.

The balls 6 can be driven over the circulation zone 7 by combination of the pressure towards the axis X which the tube 5 exerts on the balls 6 and the rotational movement of the helical track 7.

In the recirculation zone 9, the balls 6 lose contact with the tube 5.

Advantageously, the balls 6 are then successively in point contact, so that each ball 6 located on the recirculation track 9 is pushed by a directly adjacent ball towards an access 8a, 8b.

Figure 5:
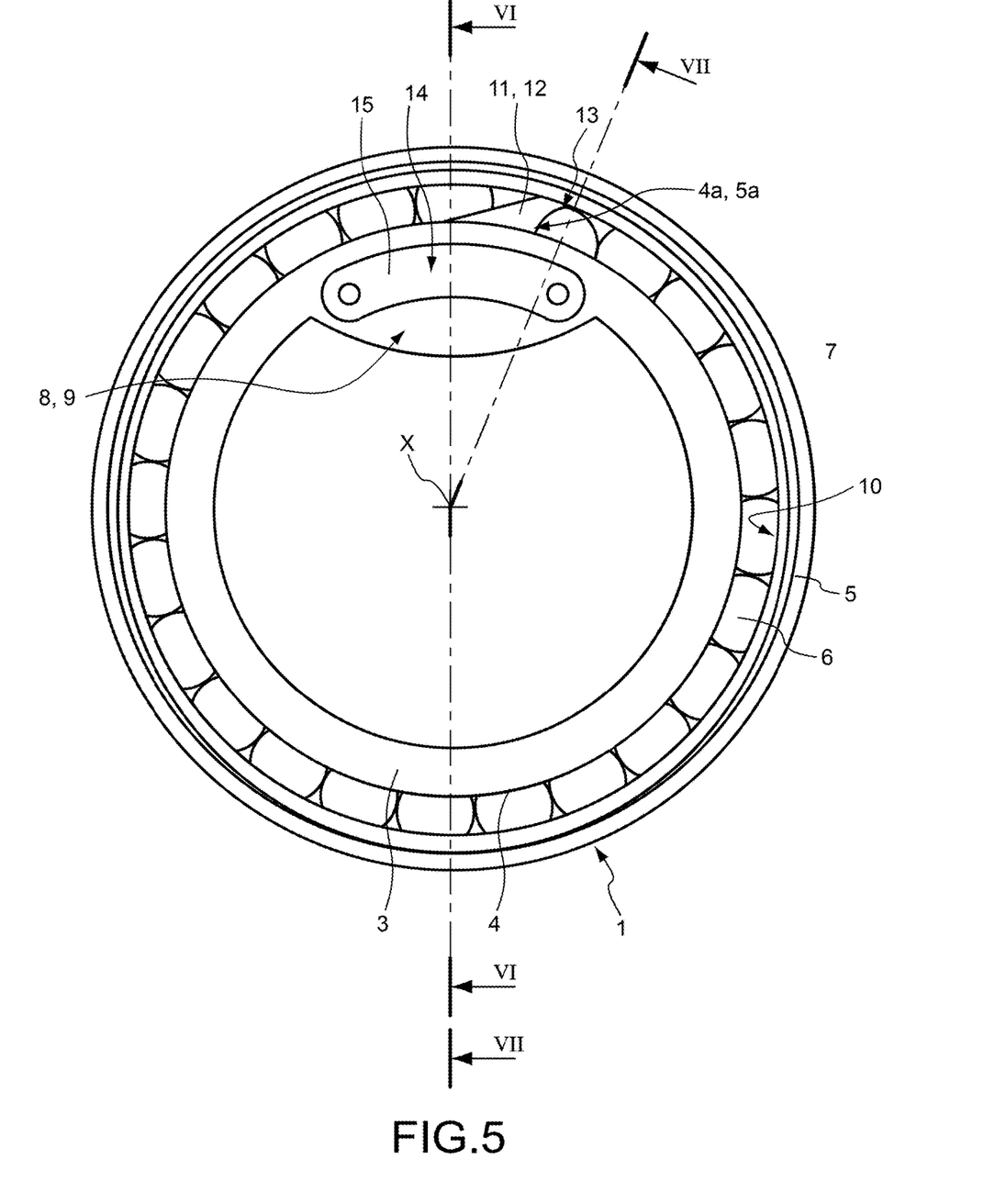
FIG. 5 shows a cross-section of the linear actuator of FIG. 1.
Figure 6:
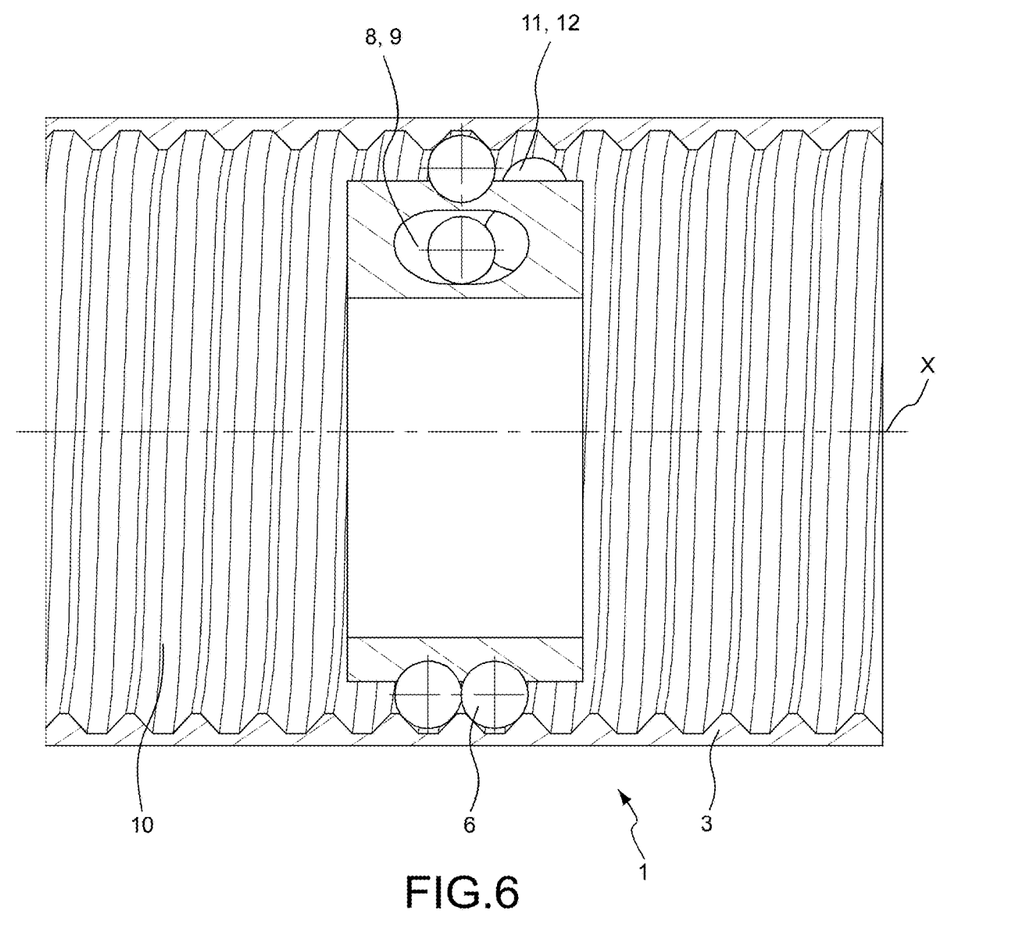
FIG. 6 shows the longitudinal section VI of the linear actuator of FIG. 5.
Figure 7:
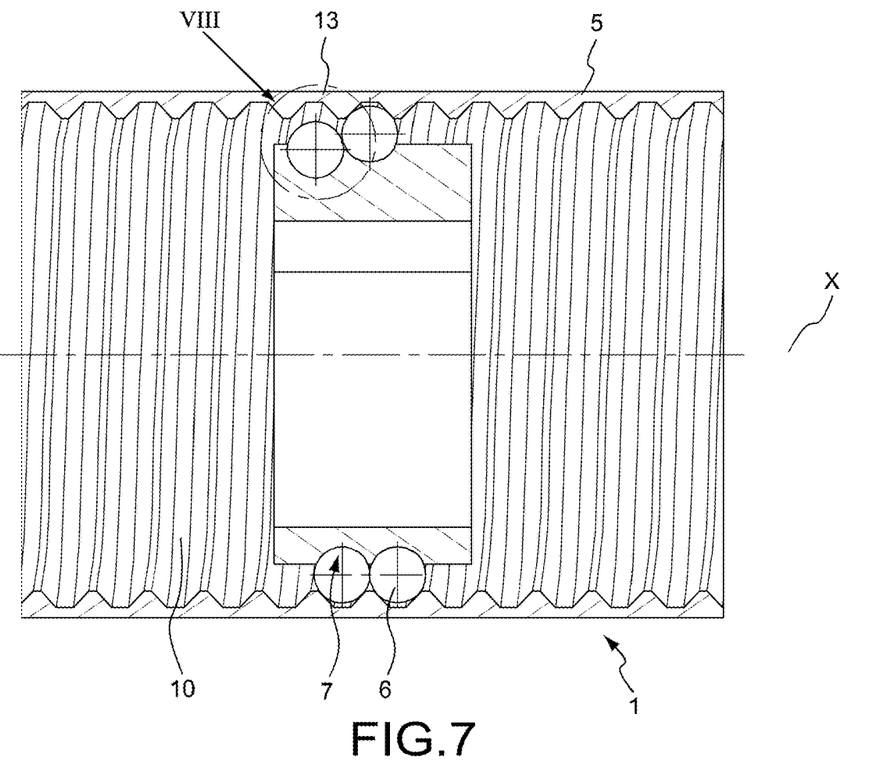
FIG. 7 shows the longitudinal section VII of the linear actuator of FIG. 5.

As illustrated in FIGS. 5 to 7, the tube 5 can further include an inner helical rolling track 10. This is then designed so that the balls 6 interact simultaneously with the outer 7 and inner 10 helical rolling tracks.

The inner helical rolling track 10 guides and promotes the helical rolling of the balls 6 on the outer track 7 when the cam 2 is axially rotated.

The cam 2 further includes transverse extensions 11 positioned facing each of the accesses 8a, 8b of the duct 8 and oriented towards the outside of the internal ring 3.

The transverse extensions 11 constitute scrapers 11 which ensure the guiding 12 of the balls 6 between the outer rolling track 7 and the inner recirculation track 9, and, in particular, the guiding of the balls 6 during their entry into the duct 8 and on the recirculation track 9.

Figure 8:
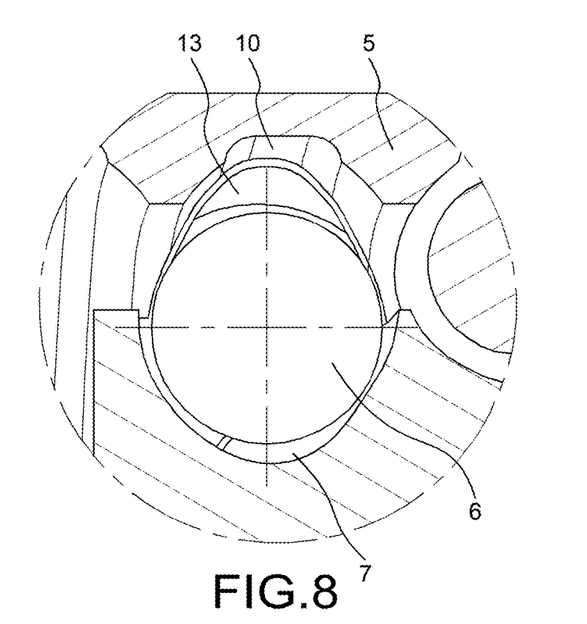
FIG. 8 shows the view VIII of FIG. 7 detailing an access of the recirculation track of the balls.

As illustrated in FIG. 8, the scrapers 11 include one end 13 fitted in the inner helical rolling track 10.

Advantageously, the end 13 is mounted either in contact with the inner track 10 so that the cam 1 and the outer tube 5 are only connected by the balls 6, or with a sliding contact with the inner track 20 so that the end 13 guides the rotation of the cam 2 in the tube 5.

Figure 9:
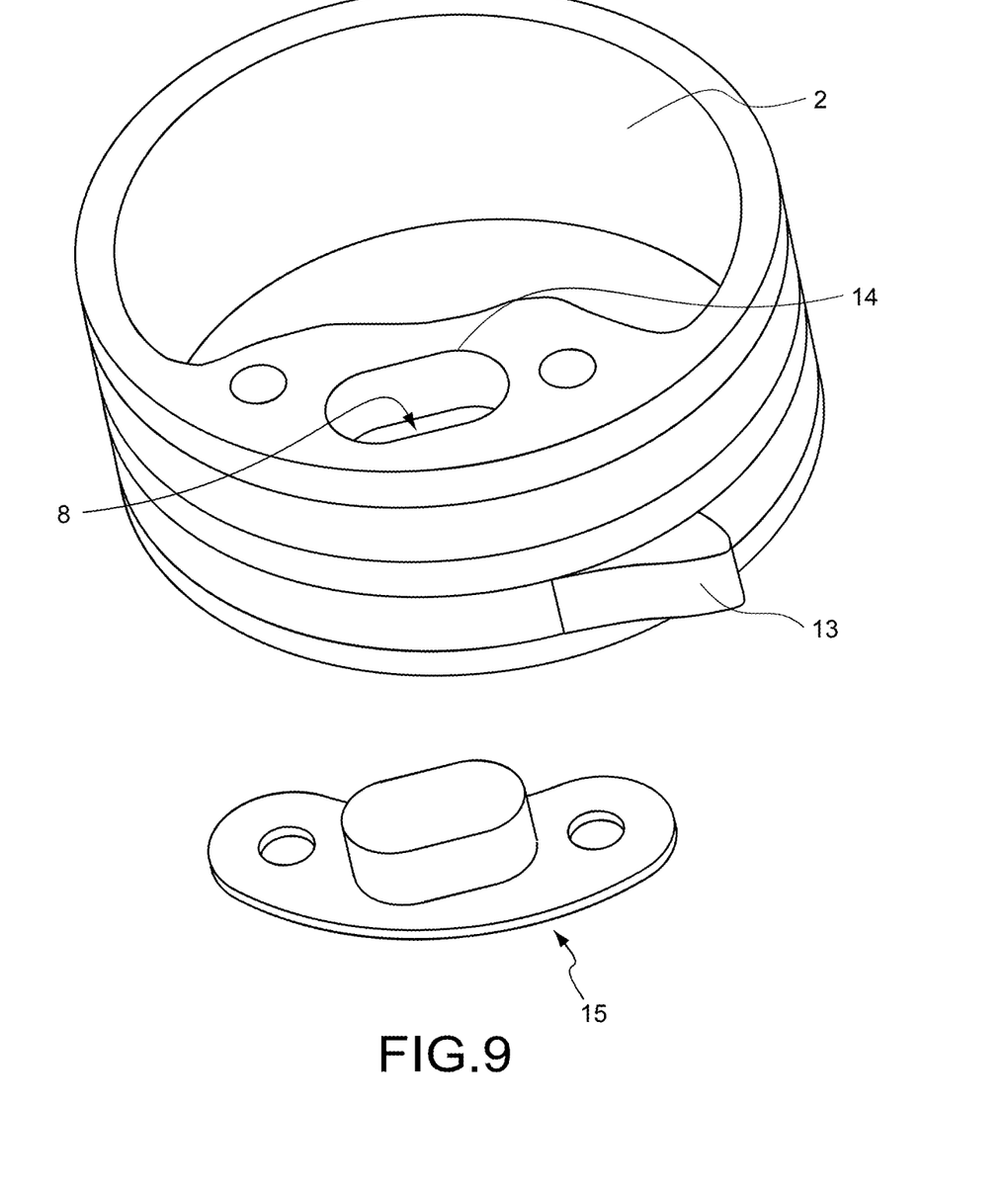
FIG. 9 shows the axial opening provided through the cam.

In addition, as illustrated in FIG. 9, the cam 2 may include an opening 14 extending from the outer section 4 of the ring 3 to the duct 8.

This opening 14 makes it possible for a ball 6 present in the duct 8 to be removed, for example in order to check its condition or to replace it.

A removable plug 15 can further be fitted in the opening 14 in order to facilitate this maintenance operation.

Advantageously, the opening 14 is oriented substantially parallel to the axis of the ring 3, which makes it possible to selectively change a ball 6 without separating the internal ring 3 and the external tube 5.

A linear actuator 1 is thus produced, the multi-track cam 2 of which can be particularly elongated, for an increased transfer of force when supporting a rotated shaft that is inserted in the cam 2, and for which the path of balls 6 around and in the cam 2 in order to drive an outer tube 5 in translation is particularly compact.

The invention claimed is:

1. A cam comprising a cylindrical ring having a circular outer section that defines a longitudinal axis, the ring further comprising an external helical rolling track; and a duct that connects two ends of said outer helical rolling track, said duct comprising a track configured for recirculation between the ends of the rolling track, wherein the ring includes an opening extending in a direction parallel to the longitudinal axis from an end of the ring to the duct, the cam further including a removable plug fitted in said opening, wherein the opening is configured to receive the removable plug when the removable plug is inserted in a direction parallel to the longitudinal axis.

2. The cam according to claim 1, further including a transverse extension positioned facing an access of the duct and oriented towards the outside of the ring.

3. A linear actuator including a cam according to claim 1 and an external tubular body extending along an axis of the ring of said cam, said cam being mounted movable in translation inside said external tubular body, a plurality of balls of a same diameter further being disposed between said ring and the external tubular body, in the outer helical rolling track.

4. A linear actuator including a cam according to claim 2 and an external tubular body extending along an axis of the ring of said cam, said cam being mounted movable in translation inside said external tubular body, a plurality of balls of a same diameter further being disposed between said ring and the external tubular body, in the outer helical rolling track, wherein the transverse extension comprises means for guiding balls between the outer rolling track and the recirculation track.

5. The linear actuator according to claim 1, wherein the external tubular body includes an inner helical rolling track.

6. The linear actuator according to claim 3, wherein the transverse extension includes an end fitted in the inner helical rolling track.

7. The linear actuator according to claim 4, wherein the balls are mounted in linear contact with the outer and inner helical rolling tracks.

8. The linear actuator according to claim 1, wherein two of the balls are connected in linear or point contact.

* * * * *